No. 672,070. Patented Apr. 16, 1901.
R. G. SMITH.
BICYCLE HOLDER.
(Application filed May 25, 1900.)
(No Model.)
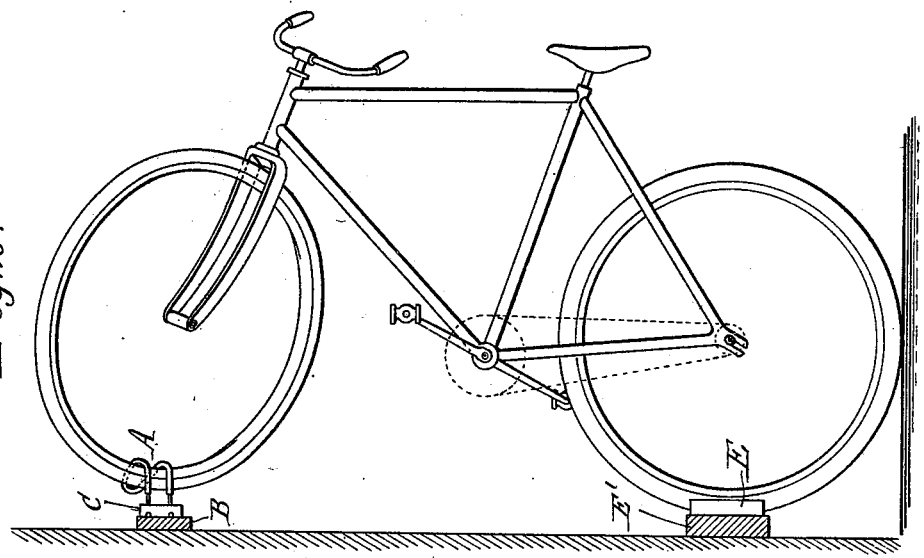
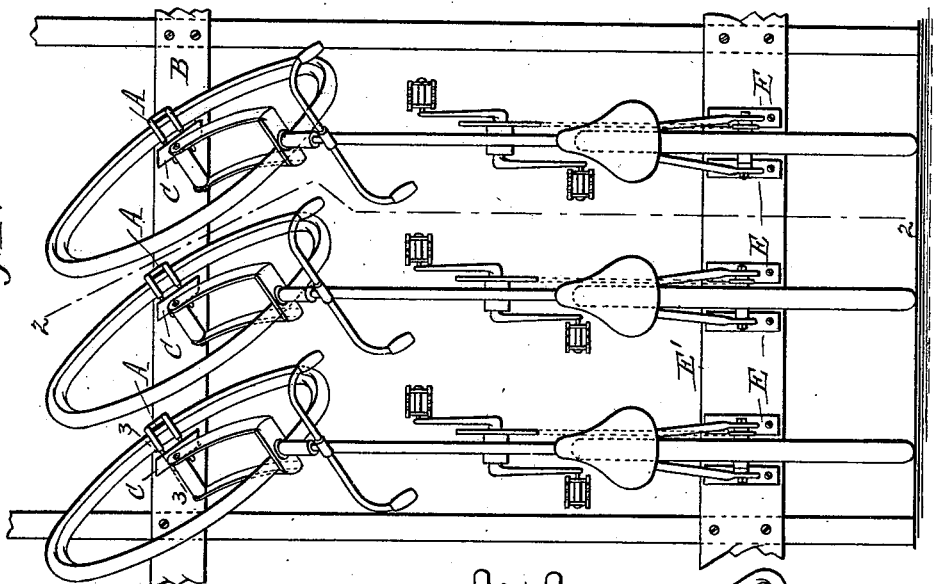
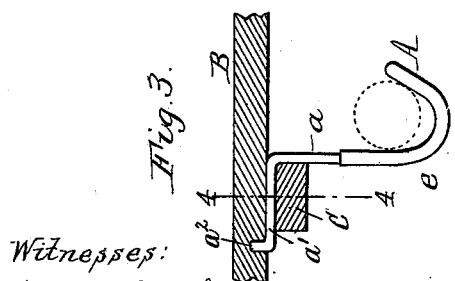
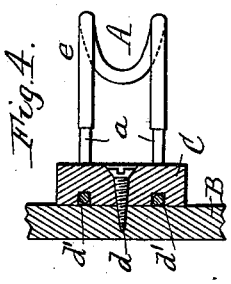
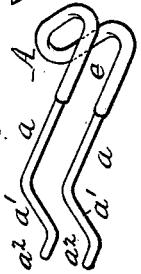
Witnesses:
Henry L. Deck.
F. F. Schwinger.
Russell G. Smith, Inventor.
By Wilhelm Bonner, Attorneys.
THE NORRIS PETERS CO., PHOTO-LITHO., WASHINGTON, D. C.

UNITED STATES PATENT OFFICE.

RUSSELL G. SMITH, OF BUFFALO, NEW YORK, ASSIGNOR TO GEORGE B. JOHONNOT, OF SAME PLACE.

BICYCLE-HOLDER.

SPECIFICATION forming part of Letters Patent No. 672,070, dated April 16, 1901.

Application filed May 25, 1900. Serial No. 17,923. (No model.)

*To all whom it may concern:*

Be it known that I, RUSSELL G. SMITH, a citizen of the United States, and a resident of Buffalo, in the county of Erie and State of New York, have invented a new and useful Improvement in Bicycle-Holders, of which the following is a specification.

This invention relates to the holders or supports which are employed principally in bicycle-rooms for supporting bicycles in a small space.

The object of my invention is to provide an inexpensive support or holder of this kind which permits a number of bicycles to be placed closely side by side in such manner that a bicycle can be conveniently engaged with one of the holders and readily detached therefrom without disturbing the bicycles on either side.

In the accompanying drawings, Figure 1 is a front view of a number of bicycles supported by my improved holders. Fig. 2 is a transverse vertical section in line 2 2, Fig. 1. Fig. 3 is a horizontal section, on an enlarged scale, in line 3 3, Fig. 1. Fig. 4 is an oblique section in line 4 4, Fig. 3. Fig. 5 is a detached perspective view of the holder.

Like letters of reference refer to like parts in the several figures.

As shown in Figs. 1 and 2, the bicycles stand vertically on their rear wheels, the latter resting on the floor of the bicycle-room. The upper or front wheel of the bicycle engages with my improved holder, which consists of a hook A, secured to the adjacent wall of the room or any other suitable upright. This hook is preferably secured to a horizontal board B, fastened to the wall and arranged at the proper height to receive the upper portion of the rim of the front wheel, the hook being sufficiently narrow to enter between a pair of adjacent spokes. The hook faces upwardly and is arranged obliquely—say at an angle of about thirty-five degrees, as shown—so that when the front wheel is engaged therewith it stands at a corresponding angle. By this angular arrangement of the front wheel the handle-bar connected with its fork is turned at a sufficient angle to clear the correspondingly-turned handle-bars of adjacent bicycles, as shown in Fig. 1, thereby permitting a bicycle to be detached from its hook by a slight turn of its handle-bars and conveniently withdrawn from between the bicycles on either side thereof without disturbing the same. By providing means for holding bicycles in this manner the same can be placed more closely together than by the use of holders which require the handle-bars to stand at right angles to the frames of the bicycles.

The oblique hook A may be of any suitable construction, but preferably consists of a double hook bent from a single piece of comparatively heavy wire. The members $a$ of its double shank are provided with rearward extensions $a'$, arranged at right angles to the shanks and each terminating in an inwardly-turned spur $a^2$, which is substantially parallel with the shank and which penetrates the board B. The shank extensions $a'$ rest against the board B and are clamped against the same by a block or cleat C, which straddles the extensions and is secured to said board preferably by a screw $d$, which passes centrally through the block and enters the board between the extensions. This block is provided on its inner side with grooves $d'$, which receive the extensions $a'$ and prevent twisting of the hook. The shank members of the hook abut against the front side of the block C, thereby stiffening the same. The main portion of the hook may be covered with rubber tubing $e$ to prevent marring of the wheel-rim which engages with the hook.

In order to prevent the lower or rear wheel of the bicycle from being shifted laterally and accidentally disengaging the upper wheel from the holding-hook, a retaining device for the rear wheel is preferably applied to the wall or upright, directly below the hook A. This retaining device may consist of a pair of upright jaws or cleats E, secured to a horizontal board E' and separated by a space of sufficient width to easily receive the rear wheel, as shown in the drawings.

To detach the bicycle from its holder, it is only necessary to grasp the handle-bar and push the front wheel against the board B, and then turn the bar sufficiently to disengage the wheel from the hook.

I claim as my invention—

1. A bicycle-holder for holding a bicycle in an upturned position with the front wheel above the rear wheel, said holder comprising an upright support and a base support for supporting the rear wheel and the frame in a vertical position, in a plane at right angles to said upright and base supports, and a hook adapted to receive the front wheel and to engage the inner side of the rim thereof between adjacent spokes, said hook opening rearwardly, toward said upright support, and upwardly at an oblique angle, whereby the front wheel and the handle-bar are supported in an oblique position, while the frame and the rear wheel are supported in a perpendicular position, at right angles to the upright and base supports, substantially as set forth.

2. A bicycle-holder for holding a bicycle in an upturned position with the front wheel above the rear wheel, said holder comprising a base support for supporting the rear wheel, an upright support provided near its bottom with forwardly-projecting upright jaws arranged at right angles to said upright support and adapted to receive the rear wheel, and a hook adapted to receive the front wheel and to engage the inner side of the rim thereof between adjacent spokes, said hook opening rearwardly, toward said upright support, and upwardly at an oblique angle, whereby the front wheel and the handle-bar are supported in an oblique position, while the frame and the rear wheel are supported in a perpendicular position, at right angles to the upright and base supports, substantially as set forth.

3. In a bicycle-holder, the combination with a wall or upright, of an upwardly-facing hook secured to said wall in a slanting position and having double shanks provided with rearward extensions arranged substantially at right angles to the shanks and bearing against said wall, and a cleat extending across said shank extensions and secured to said wall and provided in its inner side with grooves in which said extensions are seated, substantially as set forth.

4. A bicycle-holder, consisting of a double hook bent from a single piece of wire, and having parallel shanks which are provided with rearward extensions arranged at right angles to the shank, and each terminating in a spur which is arranged substantially parallel with said shanks and which projects rearwardly from the extension, substantially as set forth.

Witness my hand this 23d day of May, 1900.

RUSSELL G. SMITH.

Witnesses:
 JNO. J. BONNER,
 CYESTA HORNBECK.